United States Patent [19]

Kempkers

[11] Patent Number: 4,997,228
[45] Date of Patent: Mar. 5, 1991

[54] MULTIPLE FUNCTION VISOR

[75] Inventor: Gordon Kempkers, Hamilton, Mich.
[73] Assignee: Prince Corporation, Holland, Mich.
[21] Appl. No.: 383,542
[22] Filed: Jul. 24, 1989
[51] Int. Cl.$^5$ ............................................. B60J 3/02
[52] U.S. Cl. .................................. 296/97.2; 296/97.5; 362/137; 16/267
[58] Field of Search .................. 296/97.1, 97.2, 97.5; 362/137; 16/267

[56] References Cited

U.S. PATENT DOCUMENTS

| | | | |
|---|---|---|---|
| 3,843,236 | 10/1974 | Kurz | 350/288 |
| 4,213,169 | 7/1980 | Kempkers | 362/74 |
| 4,227,241 | 10/1980 | Marcus | 362/61 |
| 4,458,938 | 7/1984 | Viertel et al. | 296/97 |
| 4,491,899 | 1/1985 | Fleming | 296/97.5 X |
| 4,715,644 | 12/1987 | Lobanoff et al. | 296/97.1 X |
| 4,721,310 | 1/1988 | Gavagan et al. | 296/97.5 |
| 4,780,928 | 11/1988 | DeLorenzo Poz | 16/297 X |
| 4,822,095 | 4/1989 | Svensson | 296/97.1 |
| 4,858,983 | 8/1989 | White et al. | 296/97.1 X |
| 4,888,854 | 12/1989 | Russell et al. | 16/267 X |

FOREIGN PATENT DOCUMENTS

| | | | |
|---|---|---|---|
| 76174 | 4/1983 | European Pat. Off. | 296/97.1 |
| 1346774 | 11/1963 | France | 296/97.1 |

Primary Examiner—Margaret A. Focarino
Assistant Examiner—Joseph D. Pape
Attorney, Agent, or Firm—Price, Heneveld, Cooper, DeWitt & Litton

[57] ABSTRACT

A universal visor core and cover structure allows the core to be employed to accommodate any number of options. The core has pre-formed apertures for receiving a vanity mirror or illuminated vanity mirror package and cover mounting brackets. The core is upholstered to cover such apertures which are unnoticeable when the visor is a blank visor. The cover mounting bracket integrally include camming surfaces which cooperatively engage an edge of the cover for camming the cover in a snap-open or snap-closed position urging the cover into these positions for use or storage of the vanity mirror protected by such cover.

24 Claims, 2 Drawing Sheets

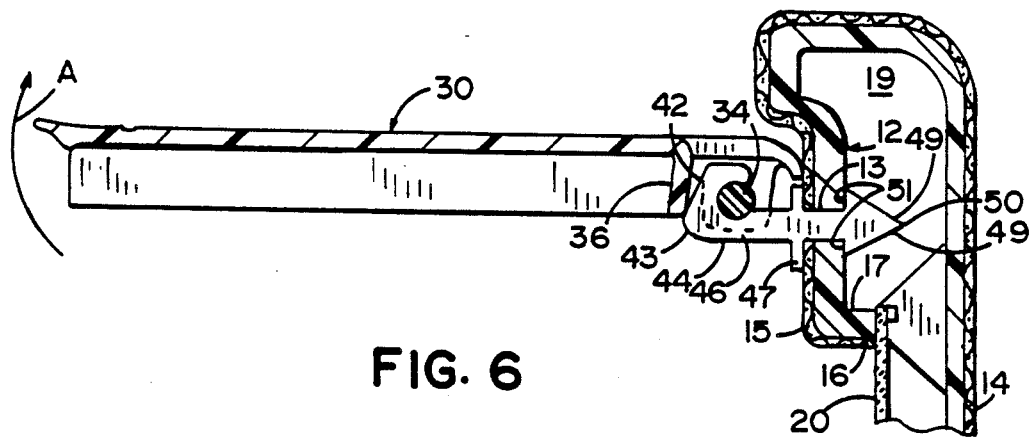
FIG. 6
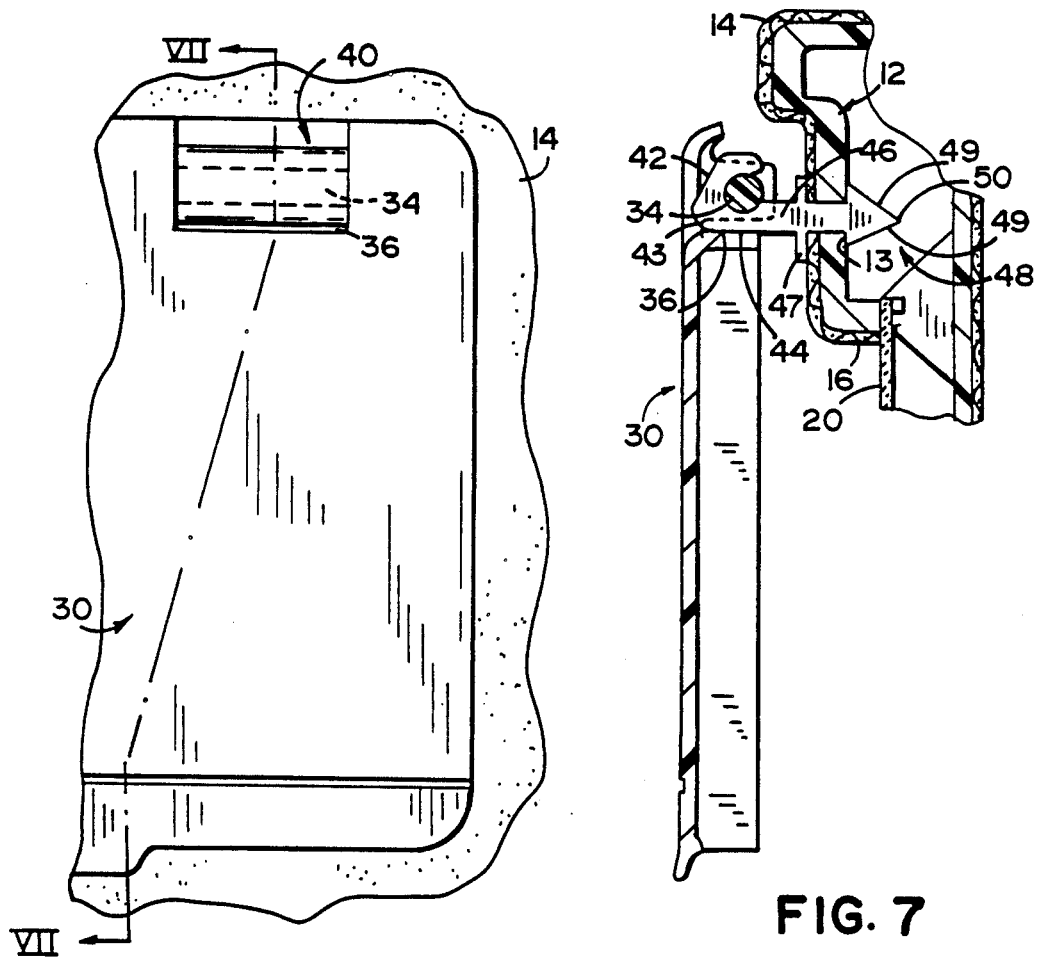
FIG. 7
FIG. 8

MULTIPLE FUNCTION VISOR

BACKGROUND OF THE INVENTION

The present invention pertains to a vehicle visor and particularly one which can accommodate a variety of options.

A significant portion of the cost of a vehicle visor is the blank visor consisting of the core member and its covering upholstery. In the past, typically visors which incorporated illuminated vanity mirrors have utilized a core specifically adapted for such a visor. See for example U.S. Pat. No. 4,227,241 which discloses an illuminated vanity mirror visor having a core with an integral recess for receiving the illuminated vanity mirror package. It would be desirable to eliminate the custom core from a cost standpoint, allowing a finished blank visor (i.e. one with no optional accessories mounted thereto) to be employed either for unadorned visors in connection with a variety of options such as a mirror or an illuminated vanity mirror covered or uncovered.

SUMMARY OF THE INVENTION

The system of the present invention provides a universal visor core and cover structure which allows the core to be employed to accommodate any number of options. Visors embodying the present invention include a core member in the shape of a visor and having pre-formed apertures for receiving a vanity mirror or illuminated vanity mirror package and mounting means for a cover. The core is upholstered to cover such apertures which are unnoticeable when the visor is a blank visor. The upholstery is selectively removed to include a mirror, or a covered mirror, or an illuminated covered mirror, utilizing the same visor core construction with the addition of one or more such options. In a preferred embodiment of the invention a cover is adapted to be mounted to the core by the utilization of a pair of mounting brackets which integrally include camming surfaces which cooperatively engage an edge of the cover for camming the cover in a snap-open or snap-closed position urging the cover into these positions for use or storage of the vanity mirror protected by such cover. These and other features, objects and advantages of the present invention will become apparent upon reading the following description thereof together with reference to the accompanying drawings in which:

BRIEF DESCRIPTION OF THE DRAWINGS

FIG. 6 is an enlarged fragmentary cross-sectional view of the visor shown in the embodiments of FIGS. 3-5 with the cover shown in an open position;

FIG. 7 is an enlarged fragmentary cross-sectional view of the structure shown in FIG. 6 shown with the cover in a closed position;

FIG. 8 is an enlarged fragmentary front elevational view of the cover and visor body.

DETAILED DESCRIPTION OF THE PREFERRED EMBODIMENT

Figure 1:
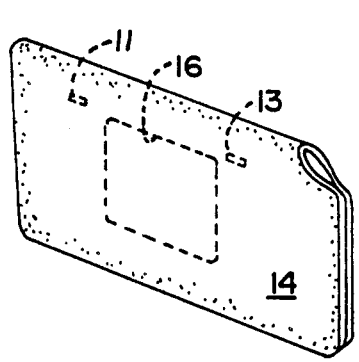
FIG. 1 is a perspective view of an upholstered blank visor embodying the present invention.
Figure 9:
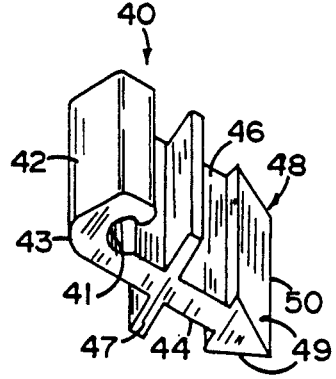
FIG. 9 is an enlarged perspective view of the mounting bracket of the preferred embodiment of the invention.

Referring initially to FIG. 1 there is shown a blank visor 10 which constitutes a visor core 12 (FIGS. 6 and 7) and upholstery covering 14. Core 12 in the preferred embodiment is made of a polymeric material such as polypropylene, however the visor core 12 may be made of any other suitable material including fiberboard structural foam or the like. Typically the core will be multi-layered and the core shown includes a front wall 15 on an integral back wall 15'. The core is covered by an upholstery material 14 which is a fabric such as cloth or vinyl. The blank 10 forming the visor typically receives a torque fitting for a visor control rod for allowing the visor to be pivoted between a raised stored position, a lowered use position as well as pivoted to the side window position, utilizing structure such as taught in U.S. Pat. No. 4,828,313 the disclosure of which is incorporated herein by reference. Core 12 will typically include a central rectangular opening 16 which may be die cut or formed in the front wall 15. When molded as seen in FIG. 6, an inwardly projecting lip 17 is provided which extends around the peripheral rectangular opening 16 which is exposed in the embodiment shown in FIG. 2 for displaying a mirror 20 secured within the visor core in a conventional manner as illustrated in FIG. 6. Core 12 also includes a pair of generally rectangular apertures 11 and 13 which are formed therein and which receive mounting means 40 (FIG. 9) for a cover 30 (FIGS. 3-8). Apertures 11, 13 and 16 in the front wall 15 of core 12 is covered by the upholstery of the blank visor 10 shown in FIG. 1 for a conventional visor with none of the options shown in the remaining Figs. In FIG. 2 the aperture 16 is uncovered by cutting away the fabric 14 and finishing the upholstery adjacent the mirror in a variety of manners such as by bonding either chemically or by a heat sealing process or mechanically as taught in U.S. Pat. No. 4,570,990. Once the torque fitting and visor pivot rod have been inserted into the blank visor 10 of FIG. 1, the visor is mounted to the vehicle for normal use.

Figure 2:
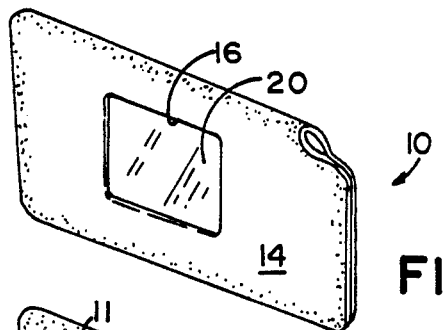
FIG. 2 is a perspective view of the visor shown in FIG. 1 with the incorporation of a mirror therein.

The visor of FIG. 2 is the same as the visor in FIG. 1 with the addition of the mirror 20 mounted as shown in FIGS. 6 and 7 but without a cover. The visor in FIG. 3 has apertures 11 and 13 exposed by trimming away the fabric by a die cutting process or simply by pushing the cover mounting members 40 through the fabric thereby puncturing the fabric in alignment with the apertures which can be located and indexed through automated machinery. The cover 30 and mounting means 40 cooperate to provide a cam action between the two for snap-up to open and snap-close positioning of the cover 30 between an open use position as shown in FIG. 6 to a close stored position as shown in FIG. 7. This is achieved by integrally forming along the upper edge 32 of cover 30, a pair of generally circular pivot axles 34 in spaced relationship and aligned adjacent apertures 11 and 13. The cover 30 adjacent pivot axle 34 and inwardly thereof includes a flange 36 as best seen in FIGS. 6–8 defines a camming surface which engages two camming surfaces 42 and 44 of mounting brackets 40.

Surfaces 42 and 44 are adjacent one another and joined by a rounded corner section 43 exterior of the pivot rod receiving semi-cylindrical socket 41 end of each bracket 40. Each of the sockets 41 of the resilient polymeric bracket 40 allow the brackets to snap fit onto the pivot rods 34 as best seen in FIGS. 6 and 7. Brackets 40 each includes a shank 46 extending from the socket 41 to fastening means or a mounting tip 48 which can take a variety of forms including an arrowhead shaped end having tapered sides 49 leading to a tip 50 in the preferred embodiment shown. Such construction allows the mounting brackets 40 to be pushed into the apertures 11 and 13 of core 12 with the rear surfaces 51 of the arrowhead shaped tip 48 engaging the inner surface of core 12 as best seen in FIGS. 6 and 7 for anchoring the cover in position. Shank 46 also includes a flange 47 spaced from surfaces 51 to engage the outer surface of the core 12 to hold the cover in fixed spaced relationship to the visor body.

When the cover is in a closed position as illustrated in FIG. 7, the flat camming surface 44 engages the upper surface of flange 36 for holding the cover in a closed position. As the cover is pivoted toward an open position as illustrated by arrow A in FIG. 6, the outer surface of flange 36 rides over the rounded portion 43 of mounting member 40 and is urged toward a stable position slightly above that shown in FIG. 6 in which the outer flat surface of flange 36 engages the flat camming surface 42 of mounting brackets 40 for urging and holding the cover in a fully open position thereby exposing mirror 20.

Figure 4:
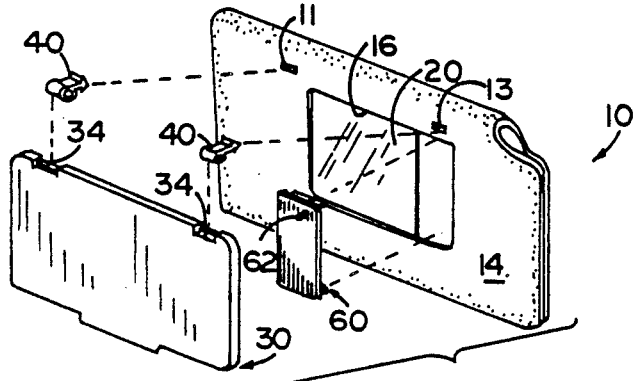
FIG. 4 is a perspective exploded view of the visor shown in FIG. 3 with the addition of a single illumination source on one side of the mirror.
Figure 5:
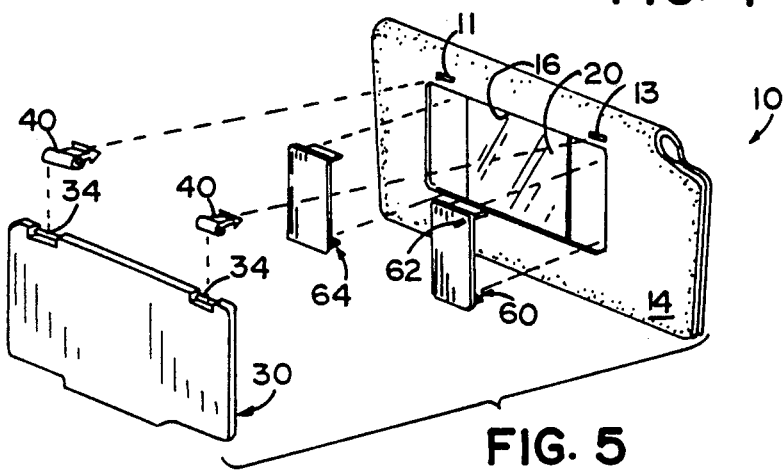
FIG. 5 is a perspective exploded view of the visor shown in FIG. 4 with an illumination source on each of the opposite sides of the mirror.

In the embodiment shown in FIGS. 4 and 5, lighting means are also fitted within the open space 19 of core 12 as taught for example in the above identified U.S. Pat. No. 4,227,241 and either one or a pair of lenses 60, or 60 and 64 respectively, are snapped fitted adjacent opposite sides of mirror 20 for directing illumination outwardly toward the face of a user of the mirror under low ambient light conditions. Lenses 60 in the preferred embodiment will include an electrical switch and actuator 62 which interacts with the inner surface of cover 30 for actuating the illumination means when the cover is moved to an open position.

Figure 3:
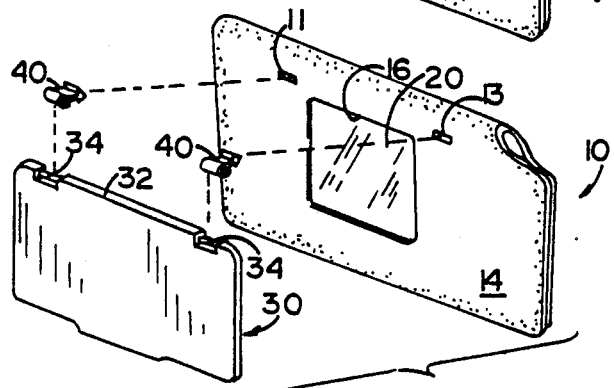
FIG. 3 is a perspective exploded view of the visor shown in FIGS. 1 and 2 showing a cover and mounting brackets for mounting the cover to the visor.

Although in the preferred embodiment the mounting means comprising bracket 40 includes an arrowhead shaped fastener 48 at one end, the shank 46 may be terminated in any number of fastening devices including fasteners which may require bonding, heat staking, screws or the like for attachment to the visor core for securing the brackets once snap fitted onto pivot axles 34 of cover 30. In the embodiment shown, blank visor 10 provides a universal construction for use with any number of combinations as illustrated in FIGS. 1-5 while the mounting means and cover provide for a snap-open and close cover for protection of the vanity mirror 20. This construction allows relatively easy assembly of the cover onto the visor as well as allowing the same visor to be covered or uncovered as illustrated in FIGS. 2 and 3 respectively and with or without illumination means as shown in FIGS. 4 and 5. It will become apparent to those skilled in the art the various other modifications to the preferred embodiment of the present invention can be made without departing from the spirit or scope thereof as defined by the appended claims.

The embodiments of the invention in which an exclusive property or privilege is claimed are defined as follows:

1. A visor comprising:
   a visor core including a mirror mounted therein;
   a visor cover for mounting to said visor core in position to cover said mirror, said cover including at least one pivot axle and a camming surface adjacent and spaced from said pivot axle; and
   means for mounting said cover directly to said core including at least one mounting bracket including a socket for receiving said pivot axle for rotation of said cover with respect to said bracket, said bracket including first and second substantially flat surfaces angularly spaced from one another engaging said camming surface of said cover for urging and holding said cover in either a closed or an open position.

2. The apparatus as defined in claim 1 and further including a curved surface joining said first and second surfaces of said bracket.

3. The apparatus as defined in claim 2 wherein said first and second surfaces of said bracket are integrally formed at one end of said bracket which includes a shank extending therefrom and terminating in fastening means at an opposite end.

4. The apparatus as defined in claim 3 wherein said core includes aperture means for receiving said fastening means of said bracket.

5. The apparatus as defined in claim 4 wherein said fastening means comprises a generally arrowhead shaped fastener at the end of said shank remote from said socket.

6. The apparatus as defined in claim 5 wherein said bracket including said first and second surfaces, said shank and said arrowhead shaped fastener is integrally formed.

7. The apparatus as defined in claim 6 wherein said bracket is made of a resilient polymeric material.

8. A visor for multiple uses comprising:
   a visor core having an aperture formed therein which is shaped for receiving a mirror, said core further including means for receiving a cover fastening means; and
   upholstery means covering said visor core, said aperture and said receiving means to provide an upholstered blank visor allowing a mirror or a cover and mirror to be added thereto.

9. The apparatus as defined in claim 8 wherein said receiving means for mounting a cover to said core comprises second aperature means spaced adjacent said first named aperture.

10. The apparatus as defined in claim 9 and further including a mirror mounted within said first named aperture.

11. The apparatus as defined in claim 10 and further including a mirror cover including bracket means for attaching said cover to said second aperture means for movement between open and closed positions.

12. The apparatus as defined in claim 11 wherein said cover includes at least one pivot axle extending adjacent one edge of said cover and a camming surface spaced from said pivot axle.

13. The apparatus as defined in claim 12 wherein said bracket means includes a socket for pivotally receiving said pivot axle and first and second angularly spaced surfaces cooperatively engaging said camming surface of said cover for urging said cover to an open or closed position over said mirror.

14. The apparatus as defined in claim 13 wherein said bracket means includes a shank extending from said socket and fastening means at an end of said shank for extending into said second aperture means of said core for securing said bracket to said core.

15. The apparatus as defined in claim 14 wherein said bracket including said first and second surfaces, said shank and said arrowhead shaped fastener is integrally formed.

16. The apparatus as defined in claim 15 wherein said bracket is made of a resilient polymeric material.

17. The apparatus as defined in claim 16 and further including means for illuminating said mirror for use in low ambient light.

18. A covered vehicle accessory comprising:
a vehicle accessory to be covered;
a cover for mounting to said accessory, said cover including at least one pivot axle and a camming surface adjacent and spaced from said pivot axle; and
a bracket for mounting said cover to said accessory including a shank having a socket at one end for receiving said pivot axle for rotation of said cover in said bracket and with respect to said accessory, said bracket including first and second substantially flat surfaces angularly spaced from one another and on an outer side of said socket for cooperatively engaging said camming surface of said cover for urging and holding said cover in either a closed or an open position.

19. The apparatus as defined in claim 18 and further including a curved surface joining said first and second surfaces of said bracket.

20. The apparatus as defined in claim 19 wherein said shank terminates in fastening means at an opposite end.

21. The apparatus as defined in claim 20 wherein said accessory includes aperture means for receiving said fastening means of said bracket.

22. The apparatus as defined in claim 21 wherein said fastening means comprises a generally arrowhead shaped fastener at the end of said shank remote from said socket.

23. The apparatus as defined in claim 22 wherein said bracket including said first and second surfaces, said shank and said arrowhead shaped fastener is integrally formed.

24. The apparatus as defined in claim 23 wherein said bracket is made of a resilient polymeric material.

* * * * *